United States Patent
Biesterfeld et al.

(10) Patent No.: US 11,010,566 B2
(45) Date of Patent: May 18, 2021

(54) INFERRING CONFIDENCE AND NEED FOR NATURAL LANGUAGE PROCESSING OF INPUT DATA

(71) Applicant: International Business Machines Corporation, Armonk, NY (US)

(72) Inventors: Troy Biesterfeld, Rochester, MN (US); Andrew R Freed, Cary, NC (US); Elizabeth Teresa Dettman, Olmstead, MN (US); Jeremy J Salsman, Rochester, MN (US); Paul R Chmielewski, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 15/986,021

(22) Filed: May 22, 2018

(65) Prior Publication Data
US 2019/0361980 A1    Nov. 28, 2019

(51) Int. Cl.
| | | |
|---|---|---|
| *G16H 10/00* | (2018.01) | |
| *G16H 10/40* | (2018.01) | |
| *G16H 50/00* | (2018.01) | |
| *G06F 40/40* | (2020.01) | |
| *G06F 17/18* | (2006.01) | |
| *G06N 20/00* | (2019.01) | |
| *G06F 16/907* | (2019.01) | |
| *G06F 40/242* | (2020.01) | |

(52) U.S. Cl.
CPC ............ *G06F 40/40* (2020.01); *G06F 16/907* (2019.01); *G06F 17/18* (2013.01); *G06F 40/242* (2020.01); *G06N 20/00* (2019.01)

(58) Field of Classification Search
CPC ...... G06F 40/30; G06F 40/40; G06F 16/3329; G06F 16/313; G06F 40/169; G06F 40/268; G06F 17/30734
USPC .......................................................... 704/9
See application file for complete search history.

(56) References Cited

U.S. PATENT DOCUMENTS

| | | | |
|---|---|---|---|
| 8,165,886 B1 * | 4/2012 | Gagnon .................. | G10L 15/19 704/275 |
| 8,510,329 B2 * | 8/2013 | Balkir ................... | G06F 16/283 707/770 |

(Continued)

OTHER PUBLICATIONS

Manana, K., Magda, T. & Maia, A. (2016). Natural Language Processing Based Instrument for Classification of Free Text Medical Records. ip.com Prior Art PMC. Digital Object Identifier: 10.1155/2016/8313454.

*Primary Examiner* — Akwasi M Sarpong
(74) *Attorney, Agent, or Firm* — Patterson + Sheridan, LLP

(57) ABSTRACT

Improved data ingestion techniques are provided. A data set comprising records is received, where each record contains one or more fields. A group of fields is identified, where each of the fields has a common metadata attribute. Metrics are determined for the group based on metadata associated with each field, and weight values are assigned to each of the metrics. A natural language processing (NLP) measure and a discreteness measure are generated for the group of fields based on the metrics and the weight values. A processing workflow is selected to use when ingesting data from the group of fields into a corpus, based on comparing the NLP measure and the discreteness measure to one or more predefined thresholds, and each of the fields in the group of fields are processed using the processing workflow.

20 Claims, 7 Drawing Sheets

(56) References Cited

U.S. PATENT DOCUMENTS

| | | | |
|---|---|---|---|
| 9,047,488 B2* | 6/2015 | Allen | G06F 21/6254 |
| 9,378,204 B2* | 6/2016 | Mueller | G06F 16/951 |
| 10,157,201 B2* | 12/2018 | Chang | G06F 16/243 |
| 10,462,422 B1* | 10/2019 | Harrison | G06Q 10/063114 |
| 2004/0015365 A1* | 1/2004 | Ohmori | G10L 15/22 |
| | | | 704/276 |
| 2004/0260717 A1* | 12/2004 | Albornoz | G06F 16/907 |
| 2007/0192143 A1* | 8/2007 | Krishnan | G16H 10/60 |
| | | | 705/3 |
| 2013/0024208 A1 | 1/2013 | Vining | |
| 2016/0026634 A1* | 1/2016 | Allen | G06N 5/02 |
| | | | 707/740 |
| 2016/0124999 A1* | 5/2016 | Gonzalez Brenes | |
| | | | G06F 16/213 |
| | | | 707/803 |
| 2016/0246945 A1* | 8/2016 | Allen | G16H 50/20 |
| 2016/0359894 A1* | 12/2016 | Andrejko | G06F 40/169 |
| 2017/0091391 A1* | 3/2017 | LePendu | G06F 21/6245 |
| 2017/0154622 A1 | 6/2017 | Liu et al. | |
| 2017/0329754 A1* | 11/2017 | Beller | G06F 40/268 |
| 2018/0101602 A1* | 4/2018 | Allen | G06F 16/90332 |

* cited by examiner

INFERRING CONFIDENCE AND NEED FOR NATURAL LANGUAGE PROCESSING OF INPUT DATA

BACKGROUND

The present invention relates to data ingestion, and more specifically, to cognitively determining an optimal processing workflow based on the generated metrics for the data.

Many computing systems and models require large amounts of curated data in order to operate. For example, deep question and answer (QA) systems, many machine learning models, neural networks, and similar cognitive systems depend on carefully curated corpuses containing a large number of documents in order to return satisfactory results. These corpuses can require significant processing and rigorous curating in order to ensure the system operates efficiently in terms of both computing resources and throughput. Additionally, a better curated corpus leads to improved results when using the system. However, the processing required to ingest data into the corpus in a form that is useful and ensures efficiency can be highly resource intensive, and wasteful for some data. For example, some data requires significant processing, such as with one or more natural language processing (NLP) models, before it can be converted into a usable format. Other data can simply be extracted and ingested without additional processing. There are no existing systems to cognitively determine the level of processing required for input data. Therefore, there exists a need for improved data ingestion techniques.

SUMMARY

According to one embodiment of the present disclosure, a method is provided. The method includes receiving a data set comprising a plurality of records, wherein each of the plurality of records contains a respective one or more fields. The method also includes identifying a first group of fields in the plurality of records, wherein each of the first group of fields has a common metadata attribute. Additionally, the method includes determining a first plurality of metrics for the first group of fields based on metadata associated with each field in the first group of fields, and assigning one or more weight values to each of the first plurality of metrics. A natural language processing (NLP) measure and a discreteness measure are generated based on the first plurality of metrics and the one or more assigned weight values. The method also includes selecting a first processing workflow of a plurality of processing workflows to use when ingesting data from the first group of fields into a corpus, based on comparing the NLP measure and the discreteness measure to one or more predefined thresholds, and processing each of the fields in the first group of fields using the first processing workflow.

According to a second embodiment of the present disclosure, a computer program product is disclosed. The computer program product comprises a computer-readable storage medium having computer-readable program code embodied therewith, the computer-readable program code executable by one or more computer processors to perform an operation. The operation includes receiving a data set comprising a plurality of records, wherein each of the plurality of records contains a respective one or more fields. The operation also includes identifying a first group of fields in the plurality of records, wherein each of the first group of fields has a common metadata attribute. Additionally, the operation includes determining a first plurality of metrics for the first group of fields based on metadata associated with each field in the first group of fields, and assigning one or more weight values to each of the first plurality of metrics. A natural language processing (NLP) measure and a discreteness measure are generated based on the first plurality of metrics and the one or more assigned weight values. The operation also includes selecting a first processing workflow of a plurality of processing workflows to use when ingesting data from the first group of fields into a corpus, based on comparing the NLP measure and the discreteness measure to one or more predefined thresholds, and processing each of the fields in the first group of fields using the first processing workflow.

According to a third embodiment of the present disclosure, a system is disclosed. The system comprises one or more computer processors and a memory containing a program which when executed by the one or more computer processors performs an operation. The operation includes receiving a data set comprising a plurality of records, wherein each of the plurality of records contains a respective one or more fields. The operation also includes identifying a first group of fields in the plurality of records, wherein each of the first group of fields has a common metadata attribute. Additionally, the operation includes determining a first plurality of metrics for the first group of fields based on metadata associated with each field in the first group of fields, and assigning one or more weight values to each of the first plurality of metrics. A natural language processing (NLP) measure and a discreteness measure are generated based on the first plurality of metrics and the one or more assigned weight values. The operation also includes selecting a first processing workflow of a plurality of processing workflows to use when ingesting data from the first group of fields into a corpus, based on comparing the NLP measure and the discreteness measure to one or more predefined thresholds, and processing each of the fields in the first group of fields using the first processing workflow.

DETAILED DESCRIPTION

Cognitive systems can utilize records and data from a wide variety of sources. This data is frequently of unknown quality and confidence, however, and must be ingested into a curated corpus before it can be used. Often, it is difficult to determine an optimal processing workflow for ingesting the data. For example, some portions of a given document may require significant NLP processing, while other parts do not. Utilizing a more resource-intensive workflow than required for a given segment of data wastes computing resources and reduces throughput because of the increased time required. This can dramatically reduce the efficiency of the cognitive system. Similarly, using a less-intensive workflow than required (i.e., simply normalizing the content rather than processing with NLP models) can lead to reduced quality of the corpus, depending on the data being ingested. This harms the accuracy and effectiveness of any models that area trained based on the corpus. Similarly, subsequent results generated by use of the corpus or models trained with the corpus to be less accurate and less useful. Embodiments of the present disclosure provide methods, systems, and computer readable storage media configured to automatically perform cognitive analysis of data sets in order to generate a number of metrics, which are used to generate various measures. These measures can then be used to determine the level of necessity for processing the data with one or more NLP models, as well as discreteness of the data and a level of confidence that users, administrators, and cognitive models can have in the quality of the data.

In some embodiments of the present disclosure, a provider or vendor of data may offer a large amount of data for ingestion into one or more corpuses. In some embodiments, the data to be ingested is formatted in XML format, or another similar format that includes a number of fields within each record or document. In one embodiment, the data includes a number of electronic medical records (EMR) or electronic health records (EHR). In an embodiment, the data is anonymized prior to processing by the Ingestion System 105. In one embodiment, the provider or vendor may initially provide a subset of data for processing by the Ingestion System 105. For example, the vendor may offer tens of millions of records, each with any number of fields. In an embodiment of the present disclosure, the vendor may therefore provide a relatively smaller subset of records for analysis, in order to determine a monetary value of the records, the amount of processing and resources that will be required to ingest the records, and the confidence that administrators of the Ingestion System 105 and subsequent cognitive models can have in the final ingested data.

Figure 1:
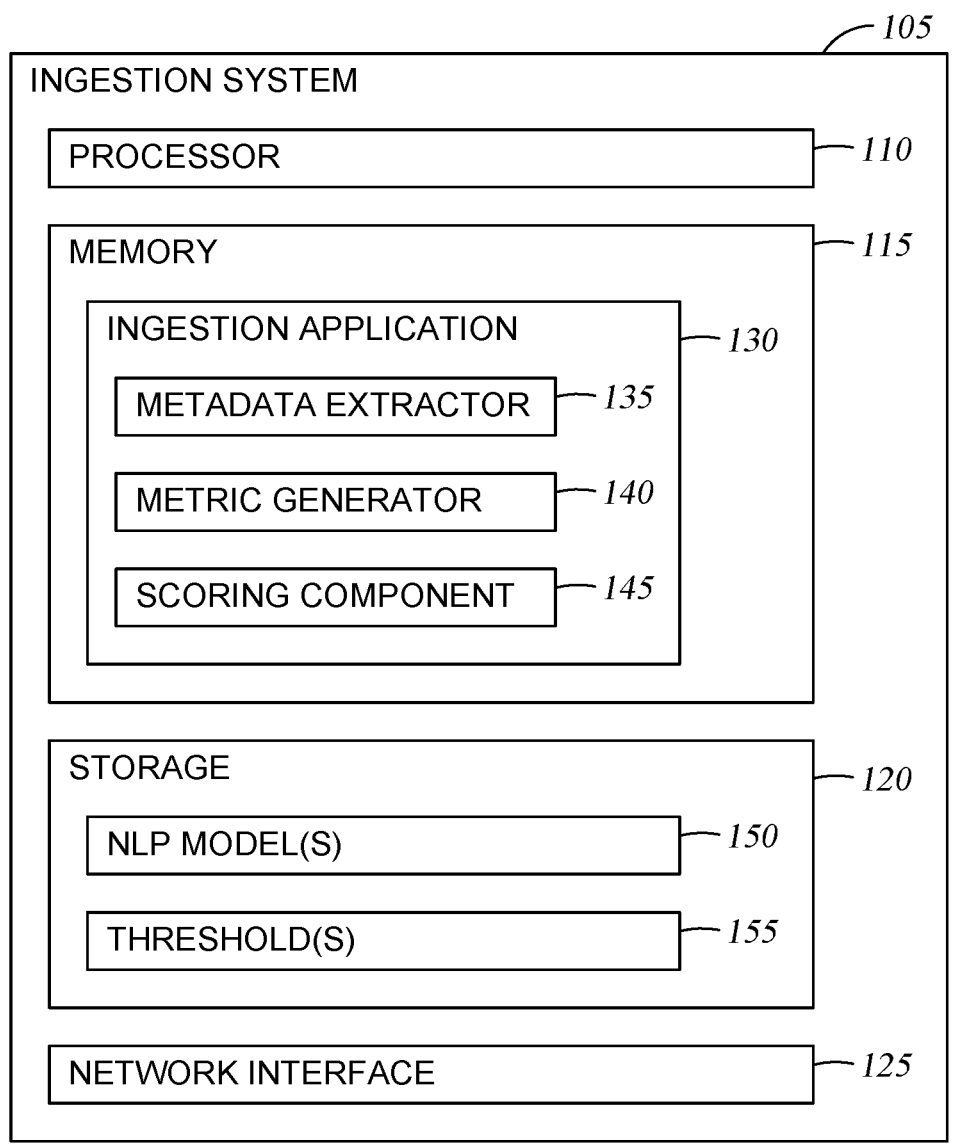
FIG. 1 is a block diagram of an ingestion system, according to one embodiment disclosed herein.

FIG. 1 is a block diagram of an Ingestion System 105, according to one embodiment disclosed herein. As illustrated, the Ingestion System 105 includes a Processor 110, a Memory 115, Storage 120, and a Network Interface 125. In the illustrated embodiment, Processor 110 retrieves and executes programming instructions stored in Memory 115 as well as stores and retrieves application data residing in Storage 120. Processor 110 is representative of a single CPU, multiple CPUs, a single CPU having multiple processing cores, and the like. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). Through the Network Interface 125, the Ingestion System 105 may be communicatively coupled with other remote devices, including client devices, cognitive analysis systems, and the like.

As illustrated, the Storage 120 includes one or more NLP Model(s) 150, as well as one or more Threshold(s) 155. Although illustrated as residing in Storage 120, in various embodiments the NLP Model(s) 150 and Threshold(s) 155 may reside in one or more other locations, such as in Memory 115, or on one or more other computing devices. The NLP Model(s) 150 are generally used to process input data to perform natural language processing, which may include normalization of the data (e.g., normalizing capitalization, spelling, and the like), as well as more rigorous NLP such as entity identification and extraction, sentiment analysis, determination of the meanings or concepts present in the data, and the like. In an embodiment, the Threshold(s) 155 are compared with one or more generated measures for the data, as will be discussed herein, to determine the appropriate and optimal processing workflow for the input data. In some embodiments, the Threshold(s) 155 is predefined by a user or administrator. In some embodiments, the Threshold(s) 155 is defined based on one or more machine learning algorithms, as will be discussed in more detail below. In one embodiment, there is a different Threshold 155 for each processing measure generated by the Ingestion System 105.

In the illustrated embodiment, Memory 115 includes an Ingestion Application 130. The Ingestion Application 130 includes several components, including a Metadata Extractor 135, a Metric Generator 140, and a Scoring Component 145. In various embodiments, the operations performed by each of these components may be performed instead by one or more other components, or the functionality of one or more components may be combined. In the illustrated embodiment, the Ingestion Application 130 receives records of unknown quality and content, and generates one or more measures describing the data, based on a variety of metrics. In an embodiment, these measures are then used to determine one or more appropriate processing workflows for ingesting the data. In some embodiments, the Ingestion System 105 also proceeds to ingest the data according to the determined workflow(s). In some embodiments, however, the data is provided to one or more other systems or devices for ingestion into the corpus. In some embodiments, the Ingestion System 105 also determines a value of the input data set. For example, based on the confidence of the data, the resources that will be required for ingestion, and the amount of data available, the Ingestion System 105 may determine a monetary or financial value of the data.

In the illustrated embodiment, the Metadata Extractor 135 extracts metadata for the input data or documents. For example, in one embodiment, the input data set includes a number of records, where each record includes one or more fields. In one embodiment where the input data set is healthcare related, each record may correspond to a particular patient or visit, and each field includes content relating to the patient or visit. For example, a first field in each record may identify the corresponding patient, while a second field includes known allergies of the patient. In one embodiment, the Metadata Extractor 135 extracts metadata of each record, each field in each record, or both. For example, in one embodiment, the metadata includes the type of the record that contains the field. In an embodiment, the metadata of each field may include the field name, the data type of the field, the value or content of the field, the number of words in the field, and the like. In some embodiments, the Metadata Extractor 135 also creates new metadata for the field or record. For example, in one embodiment, the Metadata Extractor 135 generates a normalized value of the content or value of a field, and associates this normalized value as additional metadata. In some embodiments, however, this normalized value is already included in the metadata for the field.

Once the Metadata Extractor 135 has extracted and/or generated the metadata, in an embodiment, the Metric Generator 140 operates on the metadata to generate one or more metrics relating to the data. In some embodiments, the metadata is aggregated across one or more fields or records in order to generate the processing metrics. In one embodiment, the Metric Generator 140 identifies groups of fields that are related by a common metadata attribute. In some embodiments, the Metric Generator 140 identifies groups of related fields based on the record type and/or field name. For example, in an embodiment, the Metric Generator 140 may identify the group of fields in a data set that have matching field names, as well as being associated with the same record type. For each an identified group, the Metric Generator 140 can generate one or more processing metrics describing the group, based on the corresponding metadata for each field in the group, as will be described in more detail below. In one embodiment, the Metric Generator 140 may generate metrics corresponding to a number of records in the data set (or a percentage of records in the data set) that include the field name/type corresponding to the group. For example, the Metric Generator 140 may identify a group corresponding to all fields labeled "allergies" in record type "patient data," and determine how many records in the data set (or what percentage of records) includes a field labeled "allergies."

In one embodiment, the Metric Generator 140 may generate a second metric reflecting the average number of words in fields associated with the identified group. For example, the Metric Generator 140 may determine the number of words in each field in the group, compute the average or median number of words, and assign this computed value to a second metric associated with the group. In a related embodiment, the Metric Generator 140 generates another processing metric reflecting the maximum number of words in any field in the group, as indicated by the extracted metadata. In another embodiment, the Metric Generator 140 generates a new metric corresponding to the number of distinct values found in the fields associated with the group, or the percentage of fields in the group that include a particular value. For example, a binary field that is limited to either "yes" or "no" will have only two distinct values. Similarly, for any given field in such a group, the percentage of fields (or number of fields) in the group that have an identical value is likely to be relatively large. A field including data that was originally selected from a limited list of values will similarly have a relatively constrained number of distinct values. In contrast, an open-ended field that accepts freeform typing is likely to include a large number of distinct values.

In one embodiment, the Metric Generator 140 also generates an additional processing metric based on the number or percent of fields in the group having a normalized value that matches the original value in the field. In some embodiments, the values are considered matching if they match without respect to case. For example, if the normalization used by the Ingestion System 105 involves transforming each value into a lowercase equivalent, "Peanut," "PEANUT," and "peanut" may still be considered to match, in an embodiment. In some embodiments, the normalization process involves reducing all words to their stem. For example, "running," "ran," and "runs," may be converted to "run." In various embodiment, the Metric Generator 140 may determine that "run" does or does not match with "running," "ran," or "runs." In various embodiments, the normalization process may include other similar operations, such as converting input values based on a predefined dictionary of terms.

In one embodiment, the Metric Generator 140 also generates a metric corresponding to the number or percentage of fields in the group that cannot be normalized. For example, in an embodiment, the normalization process involves converting all or a portion of each value based on a common predefined dictionary. In such an embodiment, for example, "complaint," "symptom," "issue," "manifestation," "syndrome," "expression," and the like may all be normalized and converted to "symptom" to facilitate ingestion and use of the data. In an embodiment, any words that are not found in the defined dictionary (either because they are real words not found in the dictionary, or because they are misspellings or incorrect words) may therefore be considered to be unable to be normalized. In such an embodiment, the Metric Generator 140 may generate a metric corresponding to the number or percentage of such fields in the identified group.

In embodiments of the present disclosure, the Metric Generator 140 generates one or more metrics for each identified group of fields, based on metadata associated with the fields in the group. In this way, each group of fields is assigned corresponding processing metrics, which can be processed by the Scoring Component 145 to generate one or more defined measures reflecting the level of necessity for NLP, as well as the discreteness of data in the group and confidence of the data in the group. In some embodiments, the Scoring Component 145 also compares the generated measures to the predefined Threshold(s) 155 to determine the appropriate processing workflow for the data, as will be discussed in more detail below.

In the illustrated embodiment, the Scoring Component 145 processes the metrics generated by the Metric Generator 140 and produces one or more processing measures. For example, in one embodiment, the Metric Generator 140 generates one or more of an NLP measure, a discreteness measure, and a confidence measure. In an embodiment, the NLP measure indicates a level of necessity for natural language processing when ingesting data associated with the field. For example, a high NLP measure indicates a high need for NLP, while a low NLP measure indicates that the data can be ingested without further processing. In one embodiment, the discreteness measure indicates how discrete the data in the group is, which may be related to confidence in the data. For example, if a field includes a few number if discrete values (e.g., binary fields), the discreteness measure will be higher. In an embodiment, the confidence measure relates to the level of certainty in the data. For example, data with higher confidence may refer to data where administrators are more certain that the data can be accurately ingested by the system without losing meaning. In various embodiments, the Scoring Component 145 may similarly generate additional measures for each identified group. In some embodiments, based on these measures, the Ingestion System 105 can determine the proper workflow for ingesting the data which will ensure sufficient accuracy and quality of the data, without incurring unnecessary processing costs.

Figure 2:
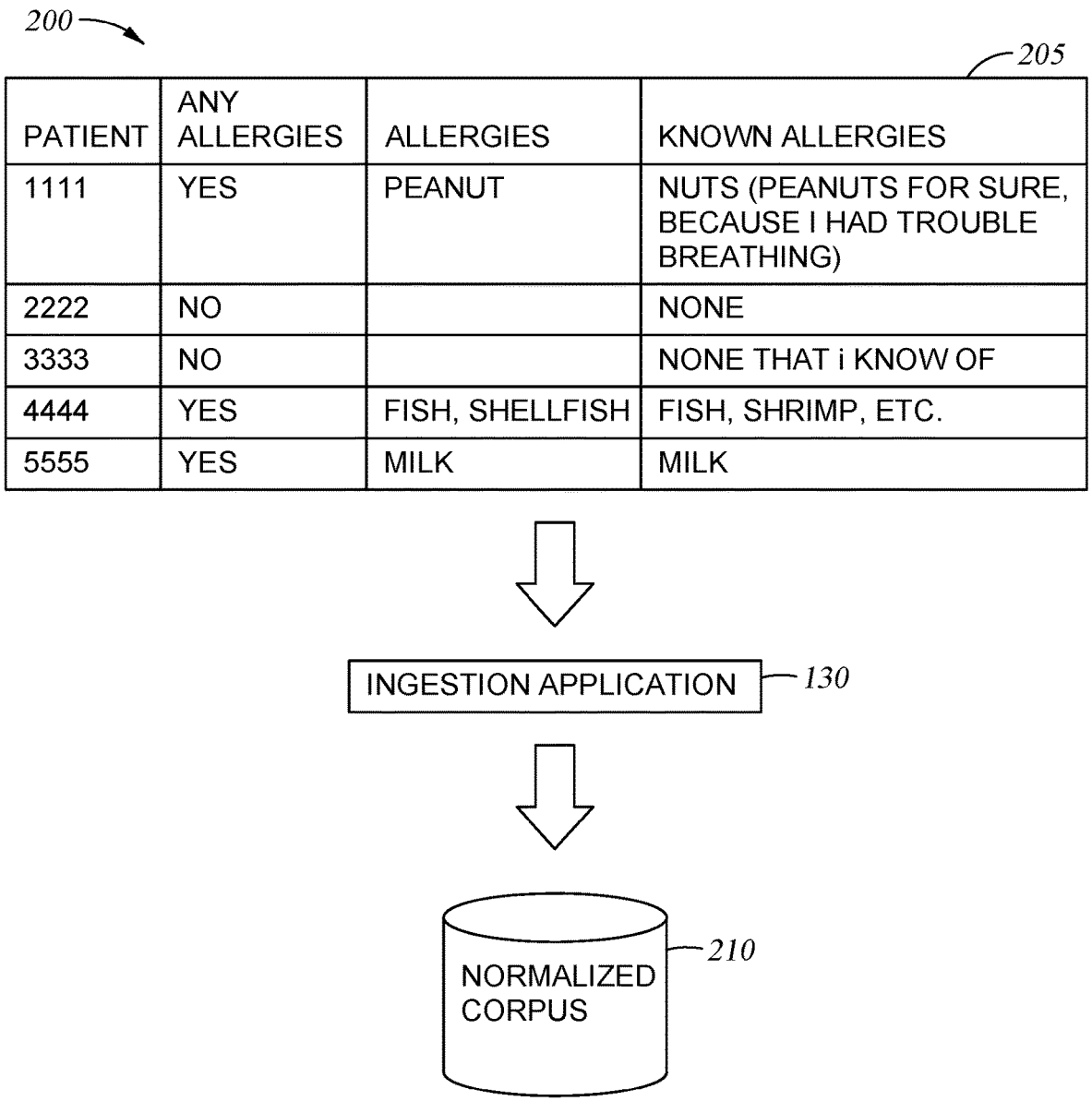
FIG. 2 illustrates a workflow for ingesting a data set into a normalized corpus, according to one embodiment disclosed herein.

FIG. 2 illustrates a workflow 200 for ingesting a Data Set 205 into a Normalized Corpus 210, according to one embodiment disclosed herein. In the illustrated embodiment, the Data Set 205 includes five records. Of course, in embodiments, any number of records may be ingested or analyzed. As illustrated, each record includes four fields, which are represented by columns in the Data Set 205. As discussed above, in embodiments, each record may have any number of fields. Further, in embodiments, records within the same data set and with the same record type may have differing number of fields. Although illustrated as a table, in embodiments, the Data Set 205 may include one or more XML formatted documents, or any other suitable formatting that includes labeled fields. In the illustrated embodiment, the Data Set 205 is provided by an EMR or EHR vendor, and it is not known which fields are discrete or free-form, nor is it known which fields will require NLP. In embodiments, the Ingestion Application 130 receives this Data Set 205 and processes it as described herein in order to determine a discreteness measure, NLP measure, and any other measures which help to determine an appropriate workflow for ingesting the data into the Normalized Corpus 210.

As discussed above, in an embodiment, the Metadata Extractor 135 extracts metadata from the Data Set 205. This metadata may include a field name, record type, value of each field, and the like. Further, in an embodiment, the Metric Generator 140 identifies groups of related fields and utilizes this extracted metadata to generate one or more aggregate metrics describing each of the identified groups. For example, in an embodiment, the Metric Generator 140 may group the fields in the Data Set 205 based on their field names or label attached to the field. In the illustrated embodiment, the Metric Generator 140 may therefore identify a first group for fields labeled/named "Patient," a second group for fields labeled "Any Allergies," a third group for fields labeled "Allergies," and a fourth group for fields that are labeled "Known Allergies." Once these groups are identified, the Metric Generator 140 may aggregate the associated metadata to generate one or more metrics for each group. In some embodiments, the Metric Generator 140 does not generate metrics for fields that serve as identification for the row (e.g., a name of the corresponding patient, a unique identifier number, and the like). Similarly, in some embodiments, the Metric Generator 140 does not generate metrics for groups that include only numerical data.

As discussed above, in one embodiment, a first metric for each group of fields may correspond to the number or percentage of records in the Data Set 205 that include the particular field, as determined based on the field name/label. In the illustrated embodiment, the value of this first metric is "100%" or "5" for all of the illustrated groups. That is, although some of the records do not include a value for the field belonging to the group of fields labeled "Allergies," each record still has the field present in the record. The value of the field is either null or empty. That is, in an embodiment, although the records associated with patient 2222 and 3333 do not specify a value for the field "Allergies," the records still include that field (e.g., the XML document includes the field, even though the field is empty). In some embodiments, the Metric Generator 140 generates a metric based on the number of fields that actually specify a value for the corresponding field, in addition or in the alternative to simply having the field. For example, in such an embodiment, the group corresponding to "Allergies" labeled fields would have a value of "three" or "60%" for such a metric.

As discussed above, in some embodiments, the Metric Generator 140 generates a metric based on the average number of words in each field in the group. For example, in the illustrated embodiment, this metric would have a value of "1" for the group corresponding to "Any Allergies" because the average number of words is one. Similarly, this metric is "1.333" for the group labeled "Allergies," and is "3.8" for the group labeled "Known Allergies." Similarly, in an embodiment, the Metric Generator 140 generates a metric for each group based on the maximum number of words found in any field in the respective group. For example, in the illustrated embodiment, the generated value for this metric is "1" for the "Any Allergies" group, "2" for the "Allergies" group, and "9" for the "Known Allergies" group.

In some embodiments, the Metric Generator 140 generates a metric for each group based on the number of distinct values in the group. For example, in the illustrated embodiment, this metric is "2" for the "Any Allergies" group, "3" for the "Allergies" group, and "5" for the "Known Allergies" group. Further, as discussed above, in an embodiment, the Metric Generator 140 generates a metric based on the number of fields in the group with a normalized value matching the original value, or the percentage of the fields with such a match. For example, in the illustrated embodiment, this metric may have a value of "100%" or "5" for the "Any Allergies" field and the "Allergies" field, but a value of "40%" or "2" for the "Known Allergies" field. Of course, in embodiments, this metric may vary based on the particular normalization methodology used. For example, in the illustrated embodiment, a medical or nutritional dictionary may be used to normalize the fields. In such an embodiment, words like "none," "fish," "shellfish," "milk," "nut(s)," and the like are likely to be found in the dictionary. Therefore, a field value of "milk" will be the same when normalized. In contrast, words like "breathing," "trouble," and "sure" are unlikely to be in such a dictionary, so fields containing these words may have normalized values that differ from the original value.

Finally, in some embodiments, the Metric Generator 140 may generate a metric based on the number or percentage of field values in the group that cannot be normalized. As discussed above, in an embodiment, a field cannot be normalized if it includes words or phrases that are not recognized by the Metric Generator 140 (i.e., because they are in a foreign language, are misspelled, and the like).

Once these metrics have been generated for each group, in an embodiment, the Scoring Component 145 may generate one or more measures for each group. As discussed above, in one embodiment, these measures include an NLP measure and a discreteness measure. In an embodiment, when the data is ingested into the corpus, data associated with a higher score for the discreteness measure may be assigned a higher confidence or weight by the Ingestion System 105 or subsequent systems that utilize the Normalized Corpus 210. Similarly, in an embodiment, data associated with a lower NLP measure may bypass NLP processing that would otherwise be completed when ingesting the data. In one embodiment, a lower value with respect to the average or maximum number of words in fields of the group, as well as a lower number with respect to the number of distinct values in the group, tends to yield a higher discreteness measure. Similarly, in an embodiment, groups with a high percentage of fields with an normalized value matching the original value, as well as a lower percentage of fields that cannot be normalized, will tend to result in a lower NLP measure.

Figure 3:
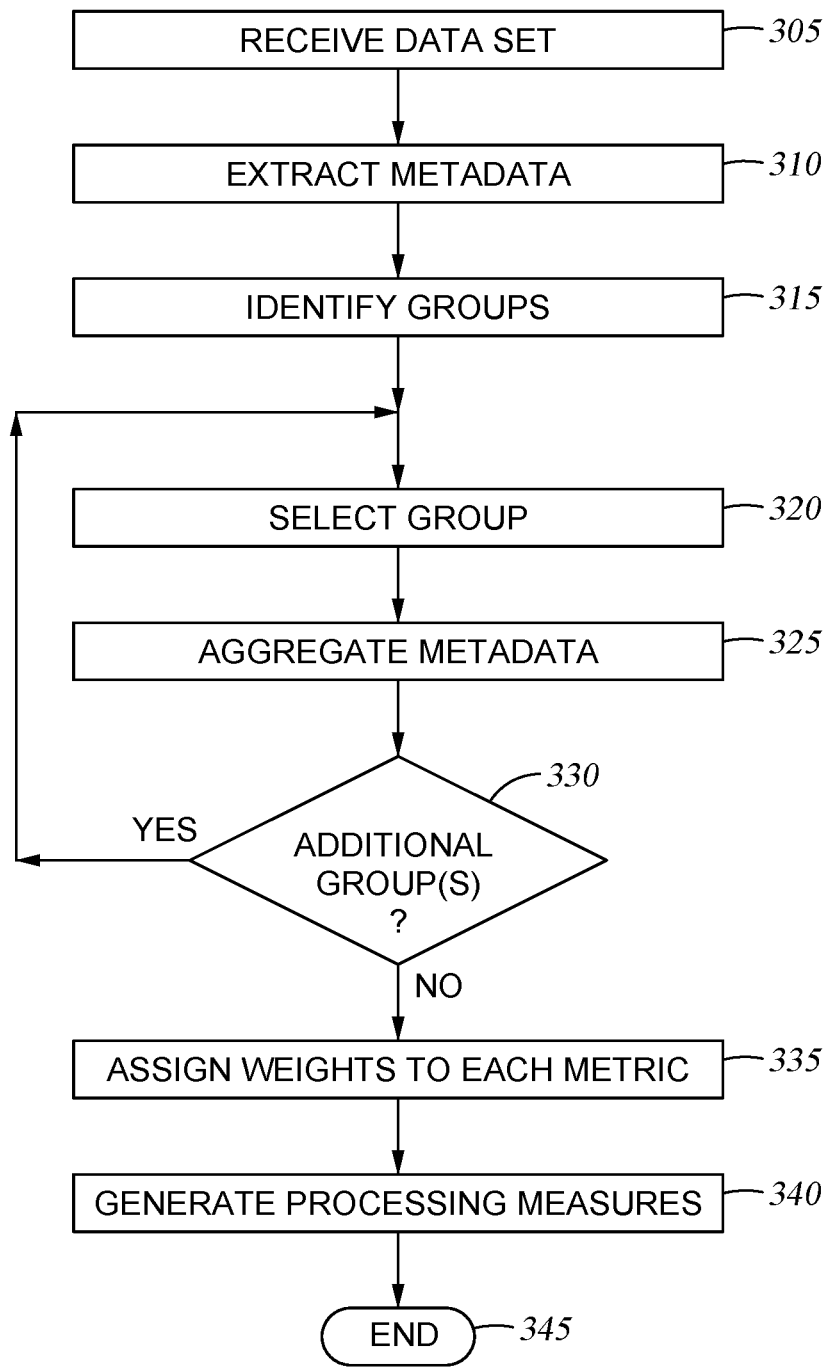
FIG. 3 is a flowchart illustrating a method of generating processing metrics for data to be ingested, according to one embodiment disclosed herein.

FIG. 3 is a flowchart illustrating a method 300 of generating processing metrics for data to be ingested, according to one embodiment disclosed herein. The method 300 begins at block 305, where the Ingestion System 105 receives a data set for processing. At block 310, the Metadata Extractor 135 extracts metadata from the input data set. As discussed above, in some embodiments, the Metadata Extractor 135 may additionally generate some metadata for each field, such as a normalized value for each field. The method 300 then proceeds to block 315, where the Metric Generator 140 identifies one or more groups of related fields, based on the extracted metadata. In some embodiments, groups containing purely numeric data are not processed further. For example, if the field has metadata indicating a data type such as "integer," further processing is not required in some embodiments.

At block 320, the Metric Generator 140 selects a first group, and at block 325, the Metric Generator 140 generates one or more metrics by aggregating the metadata associated with the selected group. The method 300 then proceeds to block 330, where the Metric Generator 140 determines whether there are additional groups remaining to be processed. If so, the method 300 returns to block 320. If not, the method 300 proceeds to block 335. At block 335, the Scoring Component 145 assigns a weight to each generated metric, indicating the importance of the respective metric to the processing measures. In some embodiments, if a metric is used to compute more than one measure, a different weight may be assigned to the metric depending on the measure being computed. For example, if the average size of fields in a group is used to calculate both the NLP measure and discreteness measure for the group, a first weight or importance may be assigned when calculating the NLP measure, and a second weight or importance may be used when computing the discreteness measure. In some embodiments, these weights may be predefined or administrator-specified. In some embodiments, the weights are determined using one or more machine learning models, as will be discussed in more detail below. Finally, at block 340, the Scoring Component 145 generates one or more processing measures for each group. At block 345, the method 300 ends.

Figure 4:
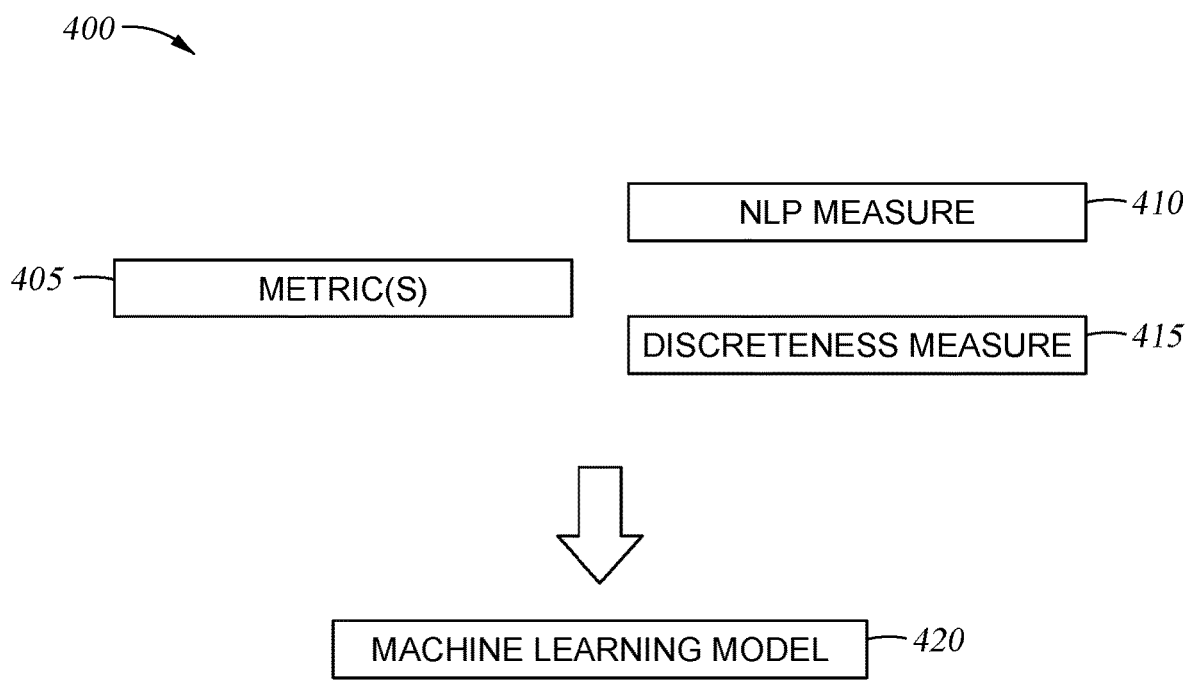
FIG. 4 illustrates a workflow for training a machine learning model to generate processing measures, according to one embodiment disclosed herein.

FIG. 4 illustrates a workflow 400 for training a Machine Learning (ML) Model 420 to generate processing measures, according to one embodiment disclosed herein. In the illustrated embodiment, a ML Model 420 is used to assign weights and generate the measures. As illustrated, one or more generated metrics (illustrated by block 405) may be provided as input to the ML Model 420, with a corresponding NLP Measure 410 and Discreteness Measure 415 provided as target output of the ML Model 420. In this way, by using a large number of training sets (each of which includes one or more metrics as input and one or more measures as target output), a ML Model 420 can thus be trained to receive new metrics and generate corresponding measures based on appropriate weights. In some embodiments, rather than provide metrics, fields or groups of fields with a known value for each measure are instead provided as input for the model. In this way, unprocessed fields with unknown characteristics can later be received and processed by the ML Model 420, which generates a value for each of the one or more measures. In some embodiments, similar training is completed, and the weights included in the ML Model 420 may be extracted to use as weights for each metric.

Figure 5:
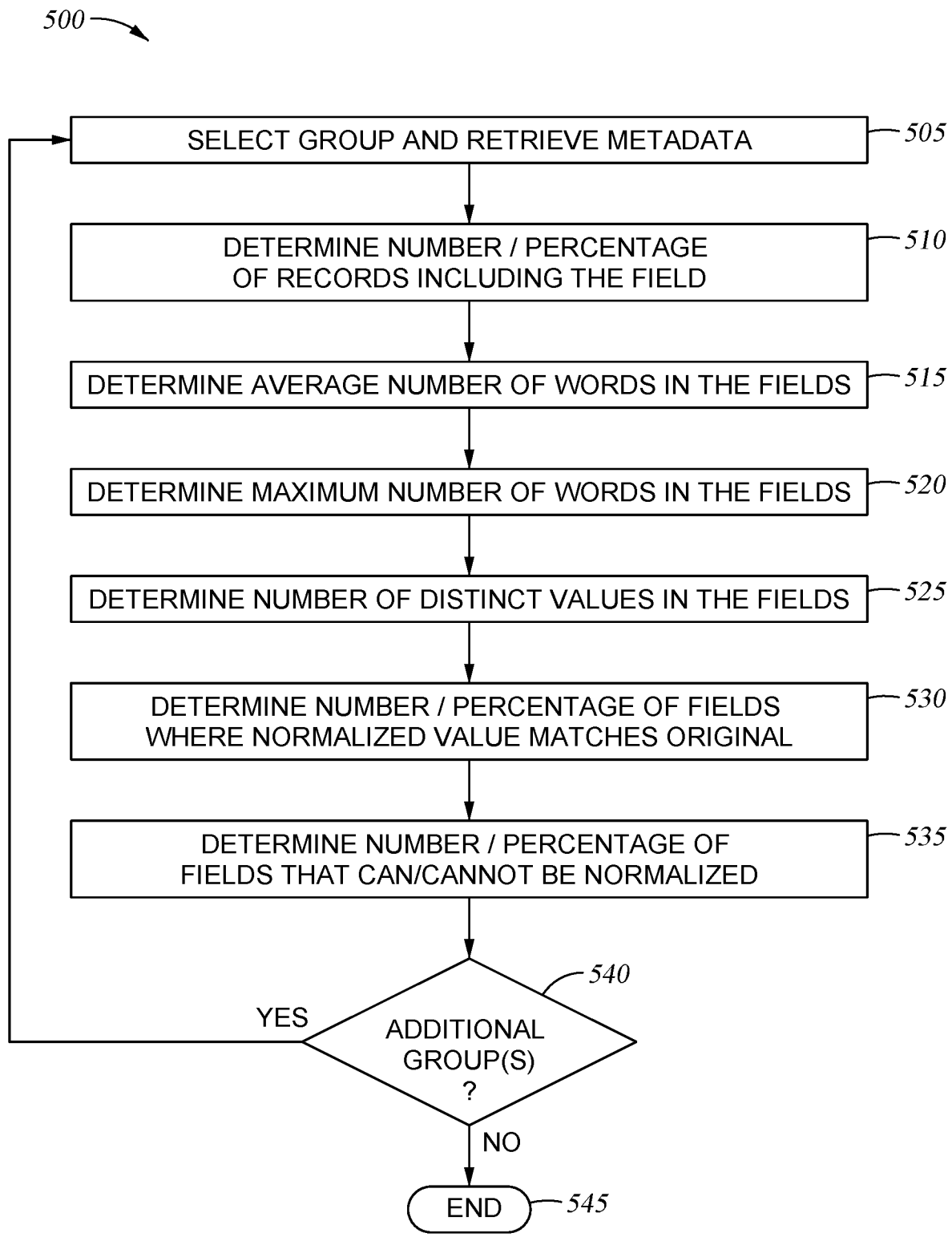
FIG. 5 is a flowchart illustrating a method of generating processing metrics, according to one embodiment disclosed herein.

FIG. 5 is a flowchart illustrating a method 500 of generating processing metrics, according to one embodiment disclosed herein. At block 505, the Metric Generator 140 selects one of the identified groups, and retrieves the metadata that the Metadata Extractor 135 extracted from the fields associated with the group. The method 500 then proceeds to block 510, where the Metric Generator 140 determines the number and/or percentage of records that include the field. At block 515, the Metric Generator 140 determines the average number of words in all the fields associated with the selected group. The Metric Generator 140 then determines the maximum number of words in any field in the selected group at block 520. The method continues to block 525, where the Metric Generator 140 determines the number of distinct values found in fields belonging to the selected group. At block 530, the Metric Generator 140 determines the number and/or percentage of fields in the selected group where the normalized value matches the original value. Finally, at block 535, the Metric Generator 140 determines the number and/or percentage of fields in the selected group that cannot be normalized. The method 500 then continues to block 540, where the Metric Generator 140 determines whether there are additional groups remaining. If so, the method 500 returns to block 505. Otherwise, the method 500 terminates at block 545.

Of course, in embodiments, any other metric may be used to determine the discreteness and necessity of NLP for the various fields. After each relevant metric is computed, the Scoring Component 145 generates the one or more measures for each group. In some embodiments, each of the processing measures is a range, such as from zero to one. In some embodiments, this range is compared to predefined thresholds to classify each measure with a discrete value such as very low, low, medium, high, and very high. In some embodiments, as discussed above, the effect of each metric on the generated measures may be decided based on an assigned importance or weight. As discussed above, in some embodiments, these weights are generated and incorporated into one or more machine learning models through a training process. In some embodiments, an administrator may specify initial weights to facilitate the training. In some embodiments, an administrator specifies weights, and adjusts the weights during operation in order to achieve satisfactory results.

In embodiments, value of the generated measures will depend on the weights used in the particular embodiment. Generally, however, a consistent correlation is present between each metric and one or more of the measures. For example, in an embodiment, the metrics corresponding to the average number of words in each field in the group, the maximum number of words in any field, and the number of distinct values in the fields are all negatively correlated with the discreteness measure. That is, the higher the value for each of these metrics, the lower the discreteness measure. Similarly, in an embodiment, the metric relating to the number or percentage of fields with a normalized value matching the original value is negatively correlated with the NLP measure. That is, the higher the value for this metric, the lower the NLP measure, indicating less need for NLP when ingesting the data. Conversely, the metric relating to the number or percentage of fields that cannot be normalized is positively correlated with the NLP measure. That is, the higher this metric, the higher the NLP measure.

Additionally, in an embodiment, the metric relating to the number of records that contain the field is positively correlated with confidence in the field. That is, the higher this value, the higher confidence can be placed in data extracted from the corresponding group. In some embodiments, data from a particular group of fields is only ingested into the corpus if the confidence (i.e., the percentage or number of fields containing the field) exceeds a threshold. For example, if relatively few records (e.g., less than a hundred) or a relatively small percentage of the records (e.g., less than twenty percent) include the field, the data may be less trustworthy. Similarly, in some embodiments, when data is ingested into the corpus, each piece of data is associated with a confidence value indicating how confident users can be in the corresponding data. In an embodiment, data with a low confidence value may be accorded less weight by subsequent systems. In embodiments, this confidence may be based in part on the discreteness measure, the percentage or number of records including the field, whether NLP was used to ingest the field, and the like.

In some embodiments, based on the discreteness measure, NLP measure, and/or confidence measure, administrators can determine whether to acquire additional data from the vendor. For example, in some embodiments, a vendor may provide a relatively small data set for testing purposes, and offer the entire data set if desired. For example, based on the generated measures, it can be determined what processing resources will be required to ingest the data, as well as the quality (i.e., confidence) of the data after ingestion. In this way, administrators can determine not only whether to acquire some or all of the additional data, but also what monetary value to place on the additional data. For example, in an embodiment, an administrator may determine that some, but not all, of the fields should be acquired for ingestion into the corpus.

Figure 6:
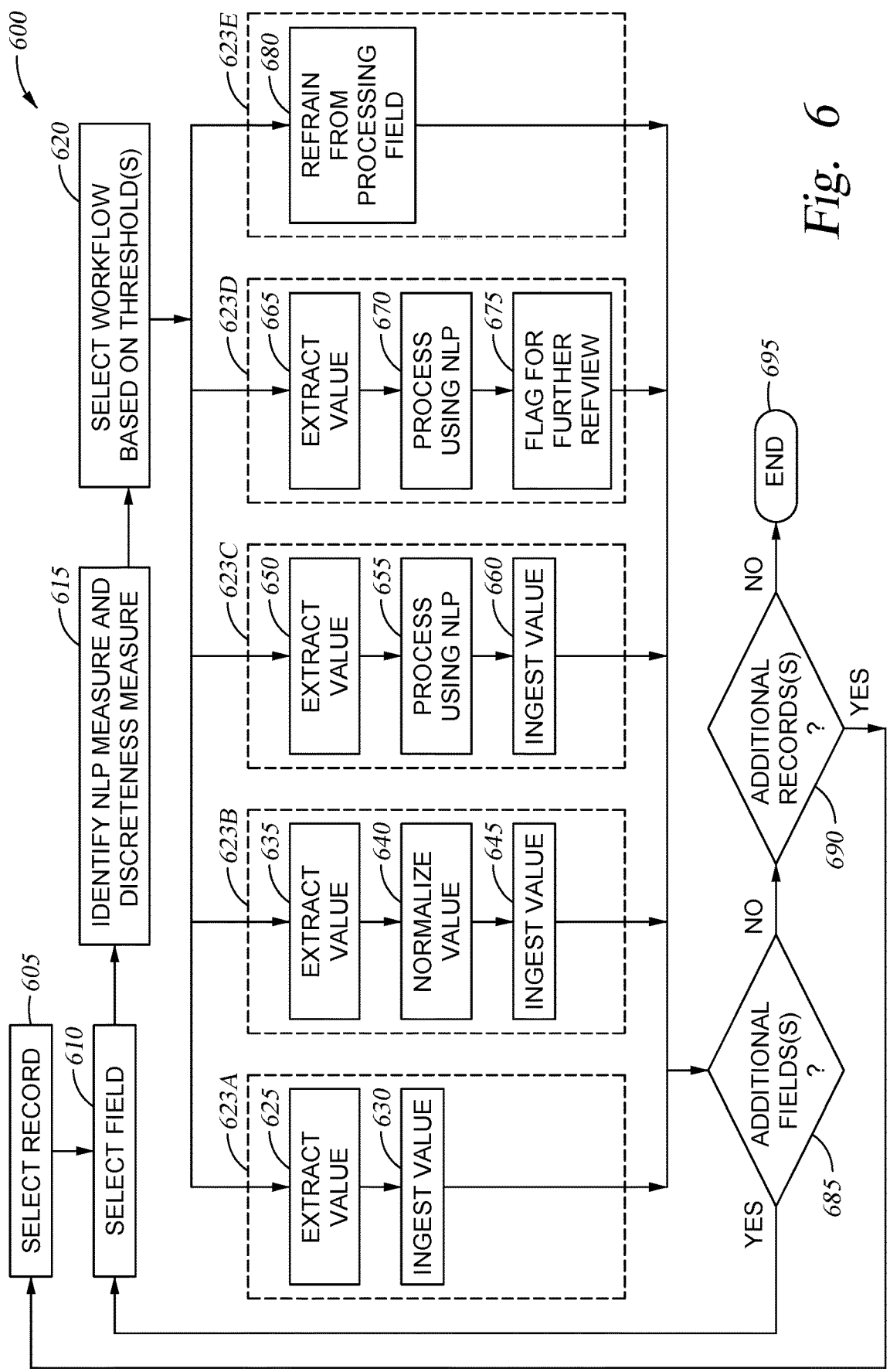
FIG. 6 is a flowchart illustrating a method of ingesting data into a corpus using a number of processing workflows, according to one embodiment disclosed herein.

FIG. 6 is a flowchart illustrating a method 600 of ingesting data into a corpus using a number of processing Workflows 623A-E, according to one embodiment disclosed herein. The method 600 begins at block 605, where the Ingestion System 105 selects a first record in the data set. As discussed above, in some embodiments, vendors provide some relatively smaller subset of data for analysis, and offer the larger data set if desired. The method 600 can be applied to data sets of any size, of course. At block 610, the Ingestion System 105 selects a field in the selected record. The method 600 then proceeds to block 615, where the Ingestion System 105 determines the corresponding NLP measure, discreteness measure, and any other processing measures discussed herein. For example, as discussed above, each field may be assigned to a group of fields based on one or more attributes of the field included in metadata (i.e., field name, label, or type). The processing measures are then generated for each group, and the NLP and discreteness measures for a particular field correspond to the group to which the field belongs.

At block 620, the Ingestion System 105 selects one of a number of processing Workflows 623A-E for the selected field, based on comparing the identified measures to one or more thresholds. As illustrated, the method 600 includes five Workflows 623A-E for input data. Of course, in various embodiments, there may be any number of workflows. In the illustrated embodiment, the Workflows 623A-E are generally more resource-intensive moving from left to right, with the exception of workflow 623E, which will be discussed in more detail below. That is, in the illustrated embodiment, processing of data via Workflow 623A generally consumes fewer resources than Workflow 623B, which consumes fewer computing resources than Workflow 623D, which similarly consumes fewer resources than Workflow 623E.

As illustrated, based on a comparison between one or more thresholds and the generated one or more measures corresponding to the selected field, the Ingestion System 105 may select from Workflows 623A, 623B, 623C, 623D, and 623E. The workflow 623A is generally used for ingesting data that requires no further processing, such as numerical data, as well as other data that should be ingested without normalization or NLP. For example, for fields containing an individual name or other proper noun such as a medication, it may be best to ingest the data without any modification or normalization. Generally, fields with a high value for the discreteness measure and a low value for the NLP measure are good candidates for processing via this workflow. Of course, in embodiments, the particular threshold(s) set may vary depending on the particular implementation. In some embodiments, a different threshold may be set for each of the one or more measures.

If Workflow 623A is selected, in block 625, the Ingestion System 105 extracts the value from the selected field, and at block 630, this value is ingested directly into the corpus without further processing. The method 600 then proceeds to block 685, where the Ingestion System 105 determines whether there are additional fields in the selected record. If so, the method returns to block 610 to select the next field. If not, the method 600 continues to block 690, where the Ingestion System 105 determines whether there are additional records in the data set which have not yet been ingested. If so, the method returns to block 605 to select the next record. If all of the data set has been ingested, the method 600 terminates at block 695.

In the illustrated embodiment, processing Workflow 623B is used to process fields which may have a relatively higher value for the NLP measure than the threshold for Workflow 623A, may have a relatively lower value for the discreteness measure as compared to the threshold for Workflow 623A, or both. If Workflow 623B is selected, the method 600 proceeds to block 635, where the Ingestion System 105 extracts the value from the selected field. At block 640, the Ingestion System 105 normalizes the value. In various embodiments, this may include standardizing capitalization, converting words to a standard dictionary, and the like. Finally, at block 645, the Ingestion System 105 ingests the normalized value into the corpus. The method 600 then proceeds as discussed above.

In the illustrated embodiment, the Ingestion System 105 may also select Workflow 623C. In an embodiment, the processing Workflow 623C is used to ingest fields with a relatively higher value for the NLP measure, and/or a relatively lower value for the discreteness measure. For example, in some embodiments, an administrator may set the corresponding threshold based on a sufficiently high NLP measure and/or sufficiently low discreteness measure, indicating that the benefit of NLP outweighs the processing costs incurred for the selected field. If Workflow 623C is selected, the method 600 continues to block 650, where the value is extracted. At block 655, the Ingestion System 105 applies one or more NPL models to the extracted value, and at block 660, the results of the NLP is ingested into the corpus.

As illustrated, processing Workflow 623D may be used for ingesting fields that have a relatively high value for the NLP measure, and/or a relatively low value for the discreteness measure. In an embodiment, the Workflow 623D is used for fields that require NLP processing, but that still have a relatively low level of confidence even after the use of NLP. As illustrated, Workflow 623D begins at block 665, where the Ingestion System 105 extracts the value from the field. At block 670, one or more NLP models are applied to the extracted value. The method 600 then proceeds to block 675, where the data is flagged for further review, rather than being ingested into the corpus immediately. In one embodiment, an administrator may review some or all of these flagged fields, in order to determine whether to ingest them or make any adjustments. In some embodiments, this data is transmitted to one or more other systems which have additional or differing models or algorithms that may improve the confidence of the data. Only after such further review are these fields ingested.

Finally, the Ingestion System 105 may select Workflow 623E for the selected field. In an embodiment, Workflow 623E is used for processing of data which has a high value for the NLP measure, low value for the discreteness measure, and may also have a low confidence value. In the illustrated embodiment, the Workflow 623E includes block 680, where the Ingestion System 105 refrains from processing or ingesting the field. In some embodiments, in addition to selecting Workflow 623E based on one or more thresholds, groups of fields can also be flagged by an administrator for processing via Workflow 623E. For example, the administrator may not wish to ingest these fields into the corpus for various reasons. Although five workflows are illustrated, in various embodiments, there may be any number of processing workflows, each with any number of steps. By using the method 600, large data sets can be processed and ingested automatically. As discussed above, embodiments of the present disclosure allow for automatically and cognitively selecting a more optimal ingestion workflow for each piece of data, based on a variety of processing metrics and measures. This can significantly reduce costs of ingesting the data. For example, embodiments of the present disclosure enable a reduction in computing resources required for ingestion. This improves throughput of the system, reduces energy usage, and creates more accurate and reliable corpuses.

Figure 7:
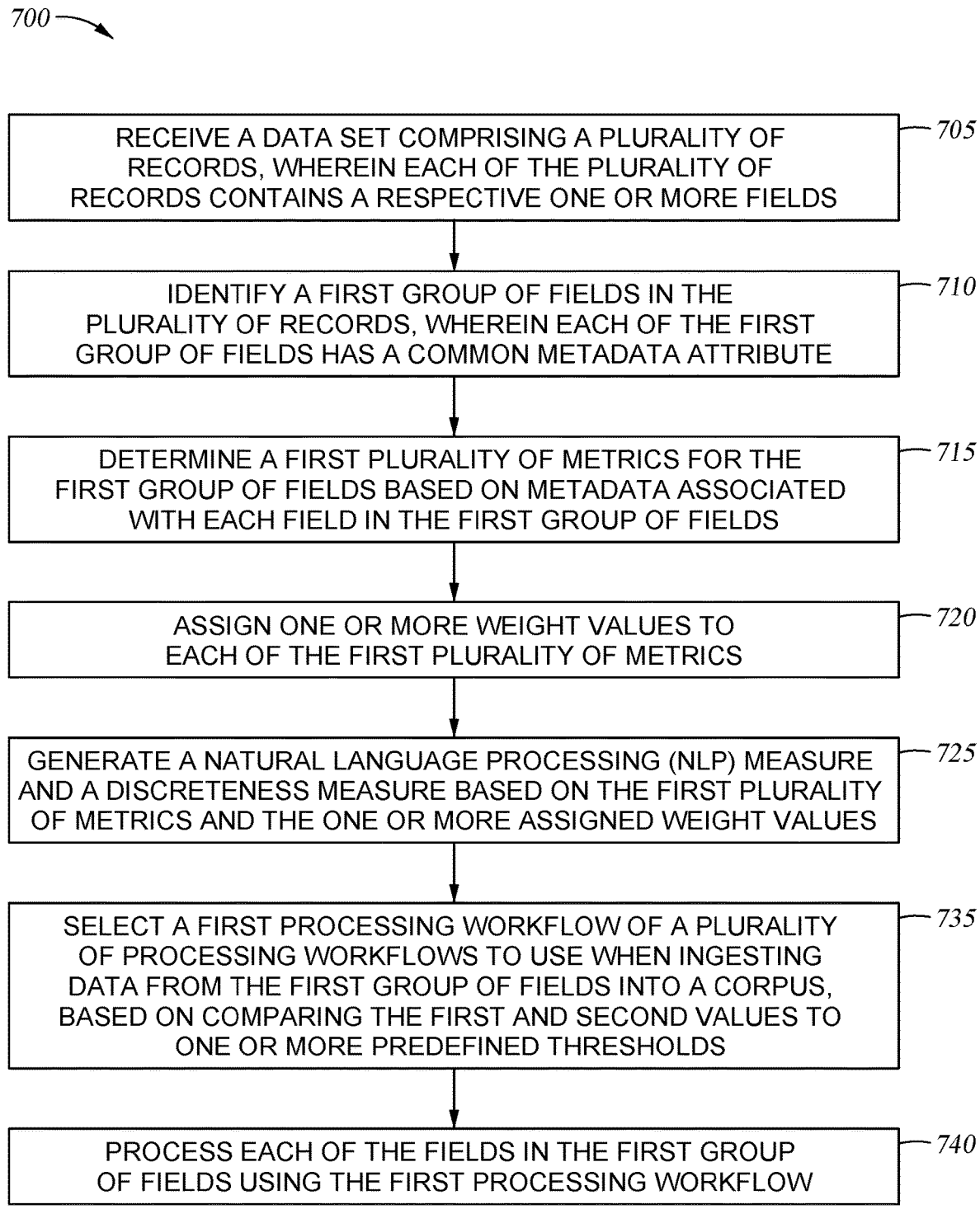
FIG. 7 is a flowchart illustrating a method of data ingestion, according to one embodiment disclosed herein.

FIG. 7 is a flowchart illustrating a method 700 of data ingestion, according to one embodiment disclosed herein. The method 700 begins at block 705, where the Ingestion System 105 receives a data set comprising a plurality of records, wherein each of the plurality of records contains a respective one or more fields. At block 710, the Ingestion System 105 identifies a first group of fields in the plurality of records, wherein each of the first group of fields has a common metadata attribute. At block 715, the Ingestion System 105 determines a first plurality of metrics for the first group of fields based on metadata associated with each field in the first group of fields, and at block 720, the Ingestion System 105 assigns one or more weight values to each of the first plurality of metrics. The Ingestion System 105 then generates a natural language processing (NLP) measure and a discreteness measure based on the first plurality of metrics and the one or more assigned weight values at block 725. The method 700 continues to block 730, where the Ingestion System 105 selects a first processing workflow of a plurality of processing workflows to use when ingesting data from the first group of fields into a corpus, based on comparing the NLP measure and the discreteness measure to one or more predefined thresholds. Finally, at block 735, the Ingestion System 105 processes each of the fields in the first group of fields using the first processing workflow.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Ingestion Application 130) or related data available in the cloud. For example, the Ingestion System 105 could execute on a computing system in the cloud and generate processing metrics and measures for input data sets. In such a case, the Ingestion Application 130 could receive and process data sets for ingestion into a corpus, and store the processing measures, metrics, and final normalized data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
receiving a data set comprising a plurality of records, wherein each respective record of the plurality of records corresponds to a respective patient of a plurality of patients contains a respective one or more fields;
identifying a first group of fields in the plurality of records, wherein the first group of fields comprises at least one field from each record from the plurality of records, and wherein the first group of fields is identified based on determining that each field in the first group of fields has a common metadata attribute, wherein the common metadata attribute comprises a label;
determining a first plurality of metrics for the first group of fields based on metadata associated with each field in the first group of fields, wherein the first plurality of metrics describe metadata aspects of the first group of fields, wherein the first plurality of metrics comprise:
(i) a percentage of records in the plurality of records that includes a field associated with the first group of fields and (ii) a number of distinct values of fields in the first group of fields;

assigning one or more weight values to each of the first plurality of metrics;

generating a natural language processing (NLP) measure and a discreteness measure for the first group of fields, based on the first plurality of metrics and the one or more assigned weight values;

selecting a first processing workflow of a plurality of processing workflows to use when ingesting data from the first group of fields into a corpus, based on comparing the NLP measure and the discreteness measure to one or more predefined thresholds; and processing each of the fields in the first group of fields using the first processing workflow.

2. The method of claim 1, wherein the NLP measure indicates a level of necessity for performing a NLP operation when processing each of the first group of fields, and wherein the discreteness measure indicates a level of confidence for values in the first group of fields.

3. The method of claim 1, wherein the metadata describing each of the respective one or more fields comprises at least one of: (i) a type of the respective field, (ii) a name of the respective field, (iii) one or more values of the respective field, (iv) a data type of the respective field, and (v) one or more NLP normalized values of the respective field.

4. The method of claim 3, wherein the first plurality of metrics includes at least one of: (i) an average number of words in each field in the first group of fields; (ii) a number of words in a largest field of the first group of fields; (iii) a percentage of the first group of fields where a normalized value of the field matches an original value of the field; and (iv) a percentage of the first group of fields where the field value cannot be normalized.

5. The method of claim 1, wherein the first processing workflow comprises:

directly extracting a value from each of the first subset of fields; and ingesting the values into the corpus.

6. The method of claim 1, wherein the first processing workflow comprises:

processing each of the fields in the first group of fields with one or more NLP models to determine a corresponding value; and ingesting the values into the corpus.

7. The method of claim 1, wherein the first processing workflow comprises:

flagging the first group of fields for additional review; and
ingesting the values from the first group of fields based on the additional review.

8. The method of claim 1, wherein the first processing workflow comprises refraining from ingesting values corresponding to the first group of fields into the corpus.

9. The method of claim 1, wherein assigning a weight value to each of the first plurality of metrics comprises processing each of the first plurality of metrics using a machine learning model, wherein the machine learning model was trained based on historical fields with a known NLP measure and discreteness measure.

10. The method of claim 1, the method further comprising determining a monetary value of the data set based on the NLP measure and the discreteness measure.

11. A computer program product comprising:

a computer-readable storage medium having computer-readable program code embodied therewith, the computer-readable program code executable by one or more computer processors to perform an operation comprising:

receiving a data set comprising a plurality of records, wherein each respective record of the plurality of records corresponds to a respective patient of a plurality of patients contains a respective one or more fields;

identifying a first group of fields in the plurality of records, wherein the first group of fields comprises at least one field from each record from the plurality of records, and wherein the first group of fields is identified based on determining that each field in the first group of fields has a common metadata attribute, wherein the common metadata attribute comprises a label;

determining a first plurality of metrics for the first group of fields based on metadata associated with each field in the first group of fields, wherein the first plurality of metrics describe metadata aspects of the first group of fields, wherein the first plurality of metrics comprise: (i) a percentage of records in the plurality of records that includes a field associated with the first group of fields and (ii) a number of distinct values of fields in the first group of fields;

assigning one or more weight values to each of the first plurality of metrics;

generating a natural language processing (NLP) measure and a discreteness measure for the first group of fields based on the first plurality of metrics and the one or more assigned weight values;

selecting a first processing workflow of a plurality of processing workflows to use when ingesting data from the first group of fields into a corpus, based on comparing the NLP measure and the discreteness measure to one or more predefined thresholds; and processing each of the fields in the first group of fields using the first processing workflow.

12. The computer program product of claim 11, wherein the NLP measure indicates a level of necessity for performing a NLP operation when processing each of the first group of fields, and wherein the discreteness measure indicates a level of confidence for values in the first group of fields.

13. The computer program product of claim 11, wherein the metadata describing each of the respective one or more fields comprises at least one of: (i) a type of the respective field, (ii) a name of the respective field, (iii) one or more values of the respective field, (iv) a data type of the respective field, and (v) one or more NLP normalized values of the respective field.

14. The computer program product of claim 13, wherein the first plurality of metrics includes at least one of: (i) an average number of words in each field in the first group of fields; (ii) a number of words in a largest field of the first group of fields; (iii) a percentage of the first group of fields where a normalized value of the field matches an original value of the field; and (iv) a percentage of the first group of fields where the field value cannot be normalized.

15. The computer program product of claim 11, wherein assigning a weight value to each of the first plurality of metrics comprises processing each of the first plurality of metrics using a machine learning model, wherein the machine learning model was trained based on historical fields with a known NLP measure and discreteness measure.

16. A system comprising:

one or more computer processors; and a memory containing a program which when executed by the one or more computer processors performs an operation, the operation comprising:

receiving a data set comprising a plurality of records, wherein each respective record of the plurality of records corresponds to a respective patient of a plurality of patients contains a respective one or more fields;

identifying a first group of fields in the plurality of records, wherein the first group of fields comprises at least one field from each record from the plurality of records, and wherein the first group of fields is identified based on determining that each field in the first group of fields has a common metadata attribute, wherein the common metadata attribute comprises a label;

determining a first plurality of metrics for the first group of fields based on metadata associated with each field in the first group of fields, wherein the first plurality of metrics describe metadata aspects of the first group of fields, wherein the first plurality of metrics comprise: (i) a percentage of records in the plurality of records that includes a field associated with the first group of fields and (ii) a number of distinct values of fields in the first group of fields;

assigning one or more weight values to each of the first plurality of metrics;

generating a natural language processing (NLP) measure and a discreteness measure for the first group of fields, based on the first plurality of metrics and the one or more assigned weight values;

selecting a first processing workflow of a plurality of processing workflows to use when ingesting data from the first group of fields into a corpus, based on comparing the NLP measure and the discreteness measure to one or more predefined thresholds; and processing each of the fields in the first group of fields using the first processing workflow.

17. The system of claim 16, wherein the NLP measure indicates a level of necessity for performing a NLP operation when processing each of the first group of fields, and wherein the discreteness measure indicates a level of confidence for values in the first group of fields.

18. The system of claim 16, wherein the metadata describing each of the respective one or more fields comprises at least one of: (i) a type of the respective field, (ii) a name of the respective field, (iii) one or more values of the respective field, (iv) a data type of the respective field, and (v) one or more NLP normalized values of the respective field.

19. The system of claim 18, wherein the first plurality of metrics includes at least one of: (i) an average number of words in each field in the first group of fields; (ii) a number of words in a largest field of the first group of fields; (iii) a percentage of the first group of fields where a normalized value of the field matches an original value of the field; and (iv) a percentage of the first group of fields where the field value cannot be normalized.

20. The system of claim 16, wherein assigning a weight value to each of the first plurality of metrics comprises processing each of the first plurality of metrics using a machine learning model, wherein the machine learning model was trained based on historical fields with a known NLP measure and discreteness measure.

* * * * *